(12) United States Patent
Itou et al.

(10) Patent No.: US 10,909,419 B2
(45) Date of Patent: Feb. 2, 2021

(54) ABNORMALITY DETECTION DEVICE, LEARNING DEVICE, ABNORMALITY DETECTION METHOD, AND LEARNING METHOD

(71) Applicants: Kabushiki Kaisha Toshiba, Minato-ku (JP); Toshiba Digital Solutions Corporation, Kawasaki (JP)

(72) Inventors: Hidemasa Itou, Inagi (JP); Takashi Morimoto, Ome (JP); Shintarou Takahashi, Kawasaki (JP); Toshiyuki Katou, Yokohama (JP)

(73) Assignees: Kabushiki Kaisha Toshiba, Minato-ku (JP); Toshiba Digital Solutions Corporation, Kawasaki (JP)

(*) Notice: Subject to any disclaimer, the term of this patent is extended or adjusted under 35 U.S.C. 154(b) by 186 days.

(21) Appl. No.: 15/703,515

(22) Filed: Sep. 13, 2017

(65) Prior Publication Data
US 2018/0082150 A1 Mar. 22, 2018

(30) Foreign Application Priority Data
Sep. 20, 2016 (JP) ................. 2016-183085

(51) Int. Cl.
*G06K 9/62* (2006.01)
*G06T 9/00* (2006.01)

(52) U.S. Cl.
CPC ............ *G06K 9/6248* (2013.01); *G06T 9/001* (2013.01); *G06T 9/002* (2013.01)

(58) Field of Classification Search
CPC ........ G06K 9/6248; G06T 9/002; G06T 9/001
(Continued)

(56) References Cited

U.S. PATENT DOCUMENTS 5,704,013 A * 12/1997 Watari ................. G06N 3/08
706/25
7,917,335 B2 3/2011 Harrison et al.
(Continued)

FOREIGN PATENT DOCUMENTS

WO WO-2017128700 A1 * 8/2017 ........... H04L 1/0054

OTHER PUBLICATIONS

Jinwon, An et al, "Variational Autoencoder based Anomaly Detection using Reconstruction Probability," SNU Data Mining Center, 2015-2 Special Lecture on IE, Dec. 2015, pp. 18.
(Continued)

*Primary Examiner* — Amandeep Saini
(74) *Attorney, Agent, or Firm* — Oblon, McClelland, Maier & Neustadt, L.L.P.

(57) ABSTRACT

An abnormality detection device of an embodiment includes an encoder, a first identifier, a decoder, and a second identifier. The encoder is configured to compress input data using a compression parameter to generate a compressed data. The first identifier is configured to determine whether a distribution of the compressed data input by the encoder is a distribution of the compressed data or a prior distribution prepared in advance, and inputs a first identification result to the encoder. The decoder is configured to decode the compressed data using a compressing parameter to generate reconstructed data. The second identifier is configured to determine whether the reconstructed data input by the decoder is the reconstruction data or the input data and outputs a second identification result to the encoder and the decoder.

7 Claims, 6 Drawing Sheets

(58) Field of Classification Search
USPC .......................................................... 382/160
See application file for complete search history.

(56) References Cited

U.S. PATENT DOCUMENTS

| | | | |
|---|---|---|---|
| 8,352,216 B2 | 1/2013 | Subbu et al. | |
| 2007/0192863 A1 | 8/2007 | Kapoor et al. | |
| 2011/0313726 A1 | 12/2011 | Parthasarathy et al. | |
| 2016/0127405 A1* | 5/2016 | Kasahara | H04L 63/1425 |
| | | | 726/23 |
| 2018/0375615 A1* | 12/2018 | Xu | H04L 1/0054 |

OTHER PUBLICATIONS

Nikkei Robotics, Jun. 2016, pp. 3 (with English Abstract).
Chao Wu et al. "Adaptive Anomalies Detection with Deep Network," Cognitive 2015 : The Seventh International Conference on Advanced Cognitive Technologies and Applications, 2015, pp. 6.
Tim Salimans et al. "Improved Techniques for Training GANs," arXiv:1606.03498v1 [cs.LG], Jun. 2016, pp. 10.

* cited by examiner

FIG. 6

| DATA NUMBER | DETECTION DATA | AUTO ENCODER OF RELATED ART | | ABNORMALITY DETECTION DEVICE OF EMBODIMENT | |
|---|---|---|---|---|---|
| | | RECONSTRUCTION DATA | DETECTION RESULT | RECONSTRUCTION DATA | DETECTION RESULT |
| 1 | NORMAL DATA | | NORMAL | | NORMAL |
| 2 | ABNORMAL DATA | | ABNORMAL | | ABNORMAL |
| 3 | ABNORMAL DATA | | NORMAL | | ABNORMAL |
| 4 | ABNORMAL DATA | | NORMAL | | ABNORMAL |

ABNORMALITY DETECTION DEVICE, LEARNING DEVICE, ABNORMALITY DETECTION METHOD, AND LEARNING METHOD

CROSS-REFERENCE TO RELATED APPLICATIONS

This application is based upon and claims the benefit of priority from Japanese Patent Application No. 2016-183085, filed Sep. 20, 2016; the entire contents of which are incorporated herein by reference.

FIELD

Embodiments described herein relate generally to an abnormality detection device, a learning device, an abnormality detection method, and a learning method.

BACKGROUND

Abnormality detection is a technology of modeling major trends in data and discovering data that should not originally exist. This is applied in various fields such as device failure detection or prediction, and network fraud detection, and is expected to be more widely applied with the development of the Internet of Things (IoT). As a method for detecting an abnormality of data, an abnormality detection method using an auto encoder is known. In this abnormality detection method, an abnormality is detected using a model which compresses and reconstructs data with as little loss as possible using a pattern or a relationship between pieces of normal data. This model performs compression and reconstruction processing with little data loss (reconstruction errors) when normal data is processed, but data loss is great when abnormal data is processed. In this abnormality detection method, an abnormality of data is detected on the basis of a magnitude of this data loss.

The auto encoder models low dimensional manifolds with high density among high dimensional data. That is, data is projected to the manifolds in compression processing, and manifolds are projected to a high dimensional space in reconstruction processing. For example, as shown in FIG. 7, a plurality of pieces (plots) of data displayed in two dimensions are projected onto a one-dimensional manifold A by compression processing. In addition, the data projected onto a one-dimensional manifold A is projected into a two-dimensional space by reconstruction processing. For this reason, an abnormality (reconstruction error) detected by the auto encoder is determined on the basis of a Euclidean distance from data to a manifold (for example, a distance D1 shown in FIG. 7). For example, when image data (normal data) of the vehicle of the data number 1 shown in FIG. 6 is processed by the auto encoder, a reconstruction error between original image data and reconstruction data is small, and thus the image data is determined to be normal. On the other hand, when image data (abnormal data) in which part of the vehicle of the data number 2 is missing is processed by the auto encoder, reconstruction data in which the missing part is supplemented is generated, and thus a reconstruction error between original image data and reconstruction data increases, and the image data is determined to be abnormal.

However, since data density on a manifold is not considered in the processing by the auto encoder, an abnormality of data cannot be detected in some cases. For example, image data (abnormal data) of a vehicle compressed in a height direction of a data number 3 shown in FIG. 6 is data (for example, data B1 shown in FIG. 7) positioned in a range with a low data density. When the image data is processed by the auto encoder, a reconstruction error between original image data and reconstruction data is not large, and thus the image data is determined to be normal. In addition, in the same manner, image data (abnormal data) of a vehicle in which a doorknob of a data number 4 shown in FIG. 6 is missing is also determined to be normal.

In addition, when squared error minimization is used to obtain a reconstruction error in the processing by the auto encoder, methods in which respective data are separated from manifolds are uniformly assumed to be a normal distribution, and thus an accurate reconstruction error may not be obtained in some cases.

In addition, as an image processing technology using learning data, a hostile network (Generative Adversarial Network: GAN) which can define a prior distribution with high degrees of freedom has been studied. In the GAN, a decoder which generates database on a prior distribution and an identifier which determines whether data is true data or generated data are used. The GAN is a data generation model and has a function of generating data based on a prior distribution, but does not have a function of reversely converting data into a prior distribution, and thus cannot be used for abnormality detection.

BRIEF DESCRIPTION OF THE DRAWINGS

FIG. 6 is a view which shows an example of a detection result by an auto encoder and the abnormality detection device according to the embodiment.

DETAILED DESCRIPTION

An abnormality detection device of an embodiment includes an encoder, a first identifier, a decoder, and a second identifier. The encoder is configured to compress input data using a compression parameter to generate compressed data. The first identifier is configured to determine whether a distribution of the compressed data input by the encoder is a distribution of the compressed data or a predetermined prior distribution, and input a first identification result to the encoder. The decoder is configured to decode the compressed data using a compressing parameter to generate reconstructed data. The second identifier is configured to determine whether the reconstructed data input by the decoder is the reconstruction data or the input data and output a second identification result to the encoder and the decoder. Hereinafter, an abnormality detection device, a learning device, and an abnormality detection method, of embodiments will be described with reference to the drawings.

Figure 1:
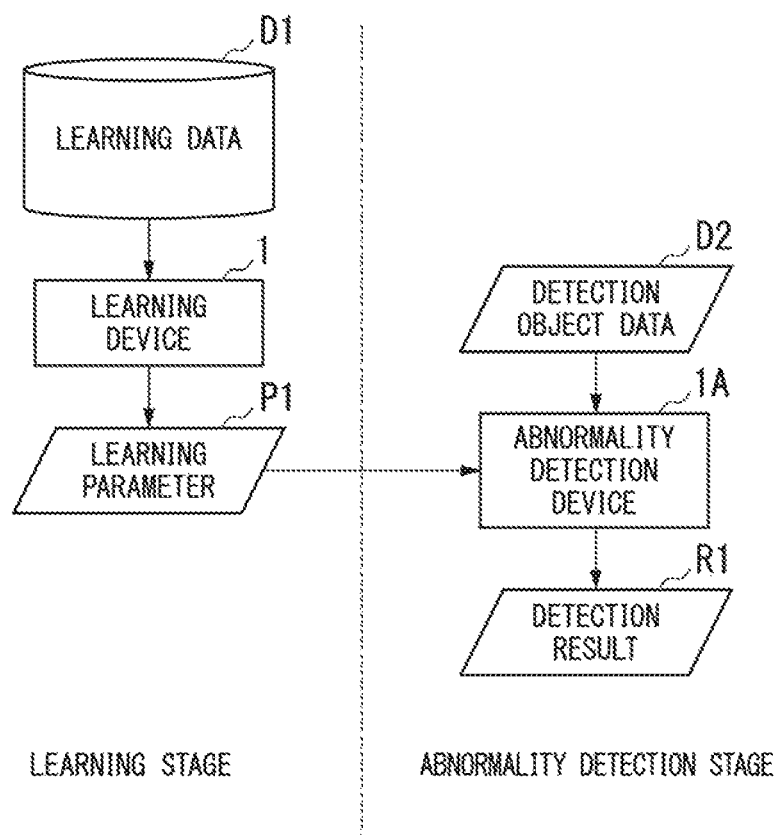
FIG. 1 is a flowchart which shows an outline of processing by a learning device and an abnormality detection device according to an embodiment.

FIG. 1 is a flowchart which shows an outline of processing of a learning device and an abnormality detection device of an embodiment. A learning device 1 performs compression processing and decoding processing (reconstruction processing) of normal data as a preparation for performing abnormality detection of data, thereby ascertaining patterns and relationships of data in the normal data and learning a procedure to perform the compression and decoding processing with few reconstruction errors. For example, the learning device 1 performs compression and decoding processing of learning data D1, and calculates a learning parameter P1 which adapts to the learning data D1.

The learning data D1 includes, for example, arbitrary data such as sensor data measured by various types of sensors, operation log data of various types of apparatuses, data of various numerical values, and data of various categories. The learning data D1 includes normal data of these types of data. The learning data D1 may include a small amount of abnormal data. Hereinafter, a stage at which the learning processing is performed by the learning device 1 is referred to as a "learning stage."

An abnormality detection device 1A detects abnormality of detection data (input data) D2 using the learning parameter P1 calculated by the learning device 1, and outputs a detection result R1. The abnormality detection device 1A can perform compression and decoding processing with small reconstruction errors on normal data, but the reconstruction errors are large when the compression and decoding processing are performed on data with a different trend from the normal data (abnormal data). A reconstruction error shows a difference between normal data and reconstruction data generated by compressing and decoding the normal data. It is possible to detect abnormal data by detecting and identifying the reconstruction error. Hereinafter, the phase in which the abnormality detection processing is performed by the abnormality detection device 1A refers to "abnormality detection stage". The learning device 1 and the abnormality detection device 1A are names classified according to the processing stage. For this reason, the learning device 1 and the abnormality detection device 1A may be implemented by the same configuration and/or same hardware and software components.

Figure 2:
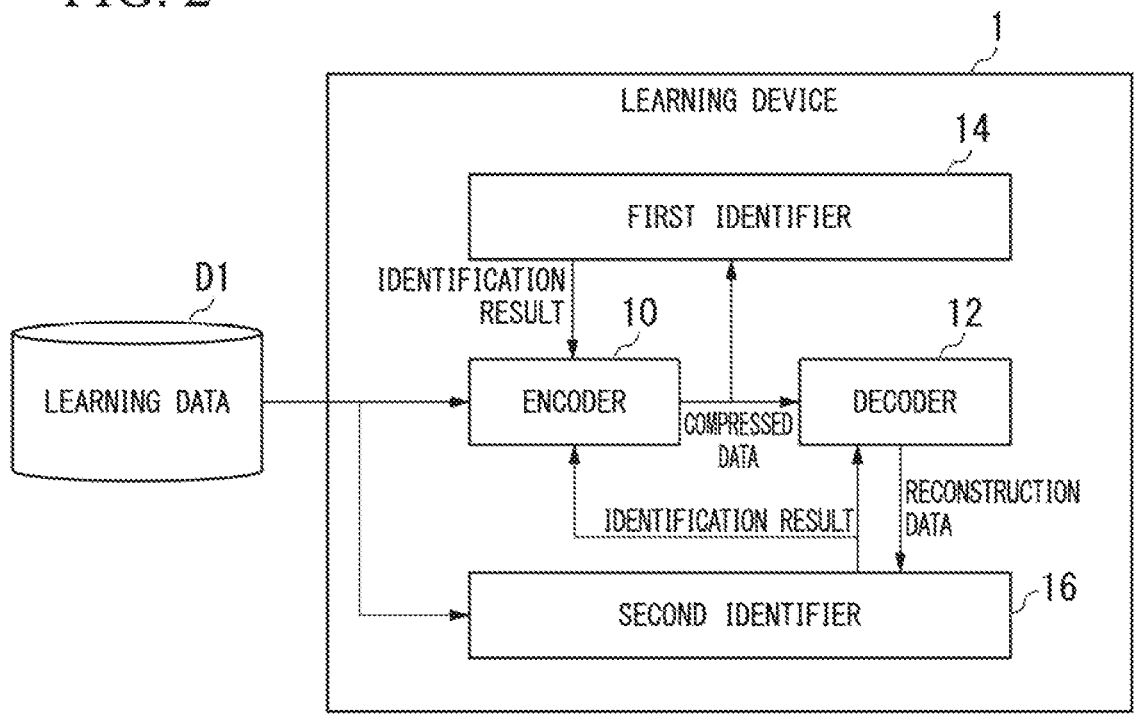
FIG. 2 is a functional block diagram which shows an example of the learning device according to the embodiment.

FIG. 2 is a functional block diagram which shows an example of the learning device 1 of the embodiment. The learning device 1 includes, for example, an encoder 10, a decoder 12, a first identifier 14, and a second identifier 16.

The encoder 10 compresses the learning data D1 and generates a compressed data and outputs the compressed data to the first identifier 14 and the decoder 12. In addition, the encoder 10 adjusts a parameter (compression parameter) used for compression processing to adapt to the learning data D1 on the basis of an identification result input from the first identifier 14. For example, the encoder 10 adjusts a compression parameter so that a difference between a distribution of the compressed data generated by the encoder 10 and a prior distribution is reduced. The prior distribution is a probability distribution defined before the learning stage, and an arbitrary distribution such as a normal distribution, a multinomial distribution, or a uniform distribution is defined. That is, the encoder 10 adjusts the compressing parameter to bring the compressed data closer to the prior distribution so that the first identifier 14 determines that a distribution of the compressed data input from the encoder 10 is the prior distribution.

The decoder 12 generates reconstruction data by decoding the compressed data input from the encoder 10, and outputs the reconstruction data to the second identifier 16. In addition, the decoder 12 adjusts a parameter (decoding parameter) used for decoding processing to adapt to the learning data D1 on the basis of an identification result input from the second identifier 16. For example, the decoder 12 adjusts the decoding parameter so that a difference between the reconstruction data generated by the decoder 12 and the learning data D1 is reduced. That is, the decoder 12 adjusts the decoding parameter so that the second identifier 16 determines that the reconstruction data input from the decoder 12 is the learning data D1.

The first identifier 14 determines whether a distribution of compressed data input by the encoder 10 is the distribution of the compressed data or the prior distribution prepared in advance, and outputs an identification result (a first identification result) to the encoder 10. For example, the first identifier 14 processes the compressed data input from the encoder 10 using a neural net, and generates final layer data and intermediate layer data. The final layer data corresponds to an output value of the neural net and the intermediate layer data corresponds to data of all layers except the final layer data and input layer data. For example, data of a layer immediately before a final layer is referred to as intermediate layer data. In addition, the first identifier 14 processes data sampled from the prior distribution using the neural net, and generates the final layer data and the intermediate layer data. The first identifier 14 compares intermediate layer data obtained from the compressed data with intermediate layer data obtained from the data sampled from the prior distribution, and performs the identification processing.

The second identifier 16 determines whether the reconstruction data input from the decoder 12 is the reconstruction data or the learning data D1 on which the compression and decoding processing are not performed, and outputs an identification result (a second identification result) to the encoder 10 and the decoder 12. For example, the second identifier 16 processes the reconstruction data input from the decoder 12 using the neural net, and generates final layer data and intermediate layer data. In addition, the second identifier 16 processes the learning data D1 using the neural net, and generates final layer data and intermediate layer data. The second identifier 16 compares the intermediate layer data obtained from the reconstruction data with the intermediate layer data obtained from the learning data, and performs the identification processing.

Each of the encoder 10 and the decoder 12 adjusts the compressing parameter and the decoding parameter on the basis of the second identification result so that a difference between the reconstruction data and the learning data D1 is reduced. That is, each of the encoder 10 and the decoder 12 adjusts the compressing parameter and the decoding parameter to bring the reconstruction data closer to the learning data D1 so that the second identifier 16 determines that the reconstruction data input from the decoder 12 is the learning data D1.

By repeatedly performing the identification processing of the first identifier 14 and the parameter adjustment processing of the encoder 10 on a plurality of pieces of learning data, the encoder 10 ascertains patterns and relationships in normal data, and learns a procedure for performing compression processing to generate compressed data having a distribution close to the prior distribution. In addition, by repeatedly performing the identification processing of the second identifier 16 and the parameter adjustment processing of the encoder 10 and the decoder 12 on a plurality of pieces of learning data, the encoder 10 and the decoder 12 ascertain patterns and relationships in normal data, and learn a procedure for performing the compression and decoding processing with few reconstruction errors.

Figure 3:
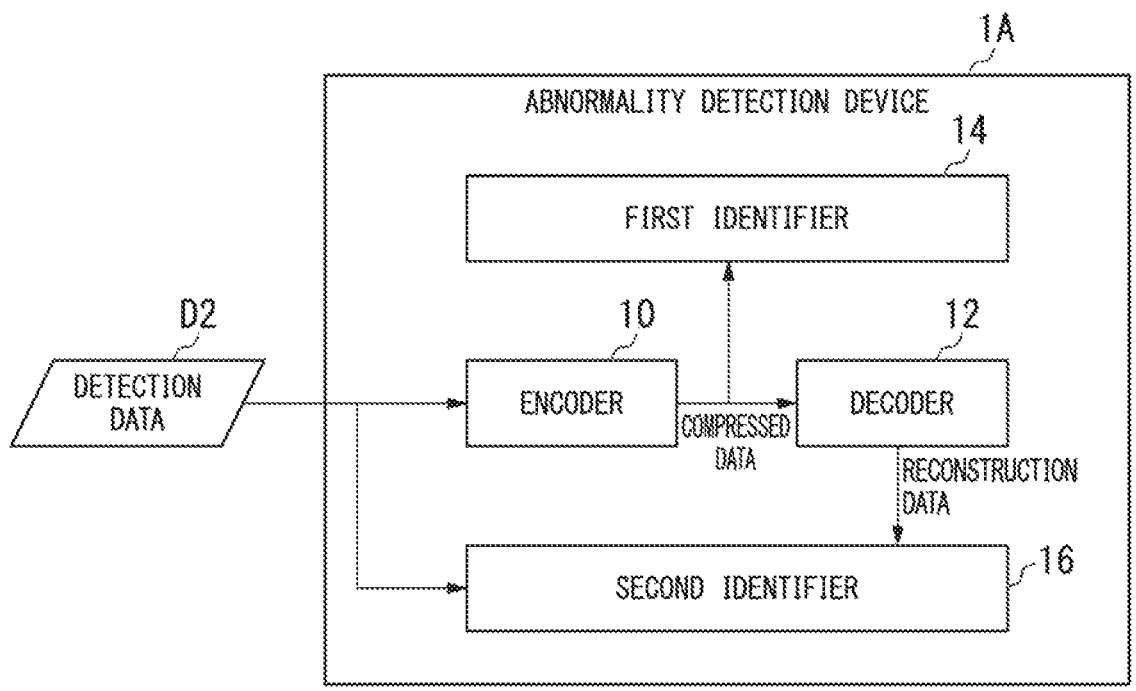
FIG. 3 is a functional block diagram which shows an example of the abnormality detection device according to the embodiment.

FIG. 3 is a functional block diagram which shows an example of the abnormality detection device 1A of the embodiment. The abnormality detection device 1A includes, for example, the encoder 10, the decoder 12, the first identifier 14, and the second identifier 16 in the same manner as the learning device 1.

The encoder 10 compresses the detection data D2, and outputs the compressed data to the first identifier 14 and the decoder 12. For example, the encoder 10 encodes the detection data D2 into a prior distribution. Accordingly, it is possible to calculate a logarithm probability on the prior distribution of the detection data D2. The detection data D2 includes arbitrary data, for example, sensor data measured by various types of sensors, operation log data of various types of apparatuses, data of various numerical values, and data of various categories.

The decoder 12 generates reconstruction data by decoding the compressed data input from the encoder 10, and outputs the reconstruction data to the second identifier 16.

The first identifier 14 determines that the compressed data is abnormal (a first abnormality) when a sum of a logarithm probability density on the prior distribution of the compressed data input from the encoder 10 and a logarithm density of a compressed data distribution and a prior distribution is equal to or less than a predetermined threshold value (a first threshold value), and determines that the compressed data is normal when the sum is greater than the first threshold value. A logarithm density ratio of the compressed data distribution to the prior distribution is obtained as a logarithm of the quotient of a priority distribution probability with respect to a compressed data probability output as a final layer of the first identifier 14. That is, the first identifier 14 sets a definition of abnormal data as rare data viewed from a normal data distribution. An occurrence probability p(x) of data x is modeled to detect rare data. The first identifier 14 may display an abnormality detection result on a display unit (not shown). In addition, the first identifier 14 may also output the abnormality detection result to an external management terminal (not shown).

The second identifier 16 calculates an abnormality degree indicating a degree of a difference between the reconstruction data input from the decoder 12 and the detection data D2, and performs abnormality detection of the detection data D2 on the basis of the abnormality degree. The second identifier 16 determines that the detection data D2 is abnormal (a second abnormality), for example, when the abnormality degree is equal to or greater than a predetermined threshold value (a second threshold value), and determines that the detection data D2 is normal when the abnormality degree is less than the second threshold value. The second identifier 16 may display an abnormality detection result on a display unit (not shown). Moreover, the second identifier 16 may also output the abnormality detection result to an external management terminal.

Some or all of the respective functional units of the learning device 1 and the abnormality detection device 1A may be realized by a processor executing a program (software). In addition, some or all of the respective functional units of the learning device 1 and the abnormality detection device 1A may be realized by hardware such as a large scale integration (LSI), an application specific integrated circuit (ASIC), or a field-programmable gate array (FPGA), and may also be realized by a combination of software and hardware.

Figure 4:
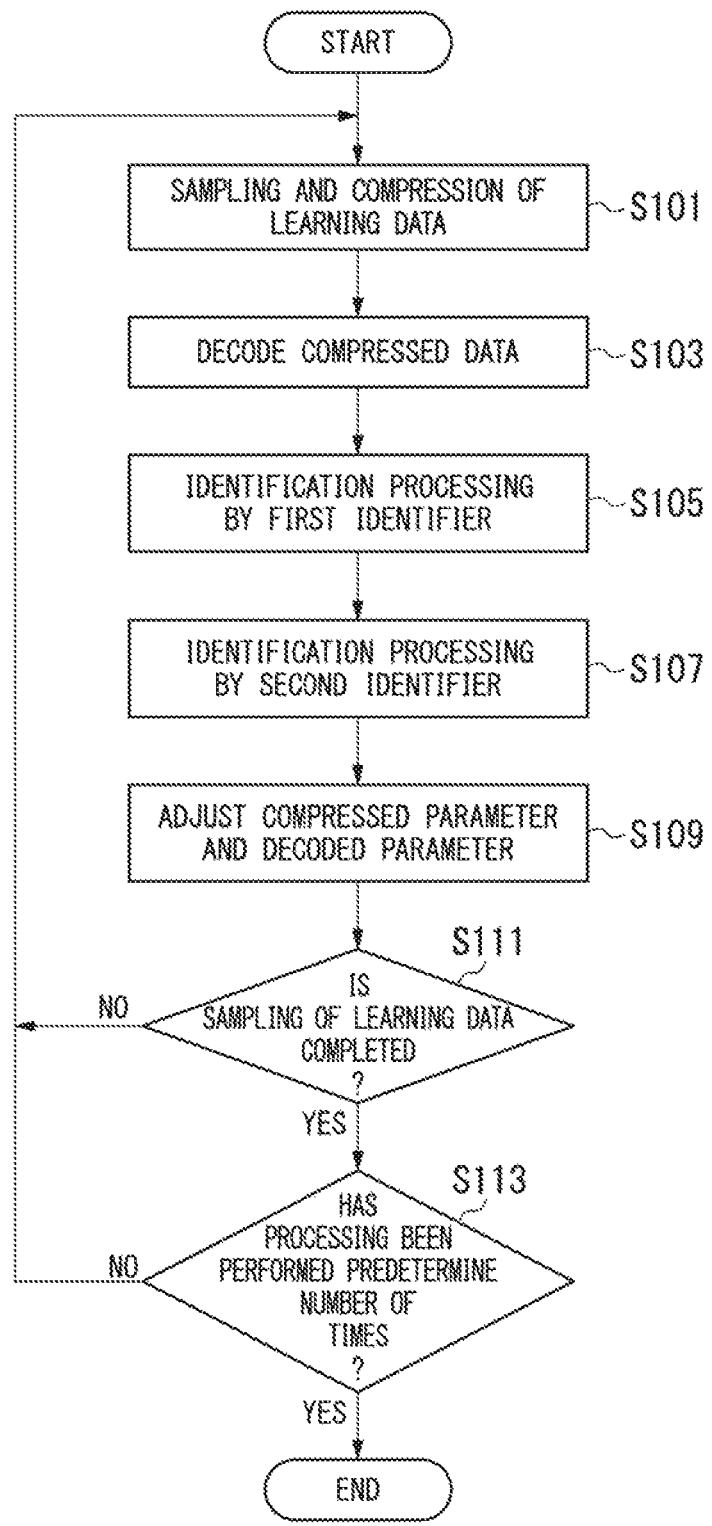
FIG. 4 is a flowchart which shows an example of a flow of processing by the learning device according to the embodiment.

Next, an operation of the learning device 1 of the embodiment will be described. FIG. 4 is a flowchart which shows an example of a flow of processing by the learning device 1 of the embodiment.

First, the encoder 10 samples at least one piece of learning data D1 from a plurality of pieces of learning data D1 (hereinafter referred to as a "learning data group") stored in, for example, a learning database (not shown), compresses the learning data D1, and outputs the compressed data to the first identifier 14 and the decoder 12 (step S101). The encoder 10 may randomly sample the learning data D from the learning database.

Next, the decoder 12 generates reconstruction data by decoding the compressed data input from the encoder 10, and outputs the reconstruction data to the second identifier 16 (step S103).

Next, the first identifier 14 identifies which vector of a vector of the compressed data input from the encoder 10 and a vector sampled from a prior distribution prepared in advance corresponds to the input data (step S05). For example, the first identifier 14 processes the compressed data using the neural net and acquires vectors of final layer data and intermediate layer data. In addition, the first identifier 14 processes the vector sampled from the prior distribution using the neural net, and acquires vectors of final layer data and intermediate layer data. Next, the first identifier 14 calculates a difference (for example, a square of the difference) in mean between the vectors of the intermediate layer data of the compressed data and the vectors of the intermediate layer data of the vector sampled from the prior distribution. This difference is expressed by the following equation (1).

$$smse \rightarrow (mean(f_s) - mean(f'_s))^2 \qquad (1)$$

In the above equation (1), $mean(f_s)$ represents a mean of the vectors of the intermediate layer data of the compressed data, $mean(f'_s)$ represents a mean of the vectors of the intermediate layer data of the vector sampled from the prior distribution, and smse represents a value obtained by squaring the difference between these means.

Next, the second identifier 16 identifies which data of the reconstruction data input from the decoder 12 and the learning data D1 on which the compression and decoding processing is not performed corresponds to the input data (step S107). For example, the second identifier 16 processes the learning data D1 using the neural net, and acquires vectors of final layer data and intermediate layer data. In addition, the second identifier 16 processes the reconstruction data using the neural net and acquires vectors of final layer data and intermediate layer data. Next, the second identifier 16 calculates a difference (for example, a square of the difference) between the vector of the intermediate layer data of the learning data D1 and the vector of the intermediate layer data of the reconstruction data. This difference is represented by the following equation (2).

$$mse \rightarrow (f - f')^2 \qquad (2)$$

In the above equation (2), f represents a vector of the intermediate layer data of the learning data D1, f' represents a vector of the intermediate layer data of the reconstruction data, and mse represents a value obtained by squaring the difference between these vectors.

Furthermore, the second identifier 16 processes the compressed data obtained by compressing the vector sampled from the prior distribution using the neural net, and acquires vectors of final layer data and intermediate layer data. Next, the second identifier 16 calculates a difference in mean (for example, a square of the difference) between vectors of the intermediate layer data obtained by processing the learning data D1 using the neural net and vectors of the intermediate layer data of the compressed data obtained by compressing the vector sampled from the priority distribution. This difference is represented by the following equation (3).

$$\text{fmmse} \rightarrow (\text{mean}(f) - \text{mean}(f''))^2 \quad (3)$$

In the above equation (3), mean(f) represents a mean of the vectors of the intermediate layer data of the learning data D1, mean(f'') represents a mean of the vectors of the intermediate layer data of the compressed data of the vector sampled from the prior distribution, and fmmse represents a value obtained by squaring the difference between these means.

Next, each of the encoder 10 and the decoder 12 adjusts a compressing parameter and a decoding parameter using a loss function defined on the basis on the above equations (1) to (3) (step S109). The loss function loss, is expressed by the following equation (4). β and γ are weights which define a relative importance of the loss function.

$$\text{loss}_{AE} \rightarrow \text{mse} + \beta \text{smse} + \gamma \text{fmmse} \quad (4)$$

The encoder 10 adjusts the compressing parameter so that a distribution of the compressed data approaches the prior distribution on the basis of the first identification result input from the first identifier 14. That is, the encoder 10 adjusts the compressing parameter so that the first identifier 14 determines that the compressed data input from the encoder 10 is the vector sampled from the prior distribution. In addition, each of the encoder 10 and the decoder 12 adjusts the compressing parameter and the decoding parameter so that a difference between the reconstruction data generated by the decoder 12 and the learning data D1 on which the compression and decoding processing are not performed is reduced on the basis of the second identification result input from the second identifier 16. That is, each of the encoder 10 and the decoder 12 adjusts the compressing parameter and the decoding parameter so that the second identifier 16 determines that the reconstruction data input from the decoder 12 is the learning data D1.

In the adjustment processing of parameters, the compressing parameter and the decoding parameter are adjusted using, for example, the following equations (5) to (8) to reduce the loss function $\text{loss}_{AE}$.

$$W_{enc} \leftarrow W_{enc} - \alpha \frac{\partial \text{loss}_{AE}}{\partial W_{enc}} \quad (5)$$

In the above equation (5), $W_{enc}$ is a weight parameter (strength of connection) held by the neural net of the encoder 10, and α is a coefficient (for example, a coefficient from 0 to 1). A differential calculation on the right side determines a gradient of $W_{enc}$ which reduces the loss function $\text{loss}_{AE}$. $W_{enc}$ is updated by multiplying the gradient direction by a value of α. In the gradient calculation and the update processing of $W_{enc}$, learning processing referred to as Stochastic Gradient Descent (SGD) method may be used, and other learning algorithms may also be used.

$$W_{dec} \leftarrow W_{dec} - \alpha \frac{\partial \text{loss}_{AE}}{\partial W_{dec}} \quad (6)$$

In the above equation (6), $W_{dec}$ is a weight parameter (strength of connection) held by the neural net of the decoder 12, and α is a coefficient (for example, a coefficient from 0 to 1). A differential calculation on the right side determines a gradient of $W_{dec}$ which reduces the loss function $\text{loss}_{AE}$. $W_{dec}$ is updated by multiplying the gradient direction by a value of α.

$$b_{enc} \leftarrow b_{enc} - \alpha \frac{\partial \text{loss}_{AE}}{\partial b_{enc}} \quad (7)$$

In the above equation (7), $b_{enc}$ is a bias, and α is a coefficient (for example, a coefficient from 0 to 1). A differential equation on the right side determines a gradient of $b_{enc}$ which reduces the loss function $\text{loss}_{AE}$. $b_{enc}$ is updated by multiplying the gradient direction by a value of α.

$$b_{dec} \leftarrow b_{dec} - \alpha \frac{\partial \text{loss}_{AE}}{\partial b_{dec}} \quad (8)$$

In the above equation (8), $b_{dec}$ is a bias, and α is a coefficient (for example, a coefficient from 0 to 1). A differential equation on the right side determines a gradient of $b_{dec}$ which reduces the loss function $\text{loss}_{AE}$. $b_{dec}$ is updated by multiplying the gradient direction by a value of α.

Furthermore, after the adjustment processing of parameters, parameters of the first identifier 14 and the second identifier 16 are adjusted to reduce learning losses of the first identifier 14 and the second identifier 16. A learning loss $\text{loss}_{smalldis}$ of the first identifier 14 and a learning loss $\text{loss}_{dis}$ of the second identifier 16 are represented by, for example, the following equations (9) and (10).

$$\text{loss}_{smalldis} \rightarrow -\log y_s[0] - \log y'_s[1] \quad (9)$$

In the above equation (9), $-\log y_s[0]$ is a term which becomes small so that the first identifier 14 can identify input compressed data as compressed data, and $-\log y'_s[1]$ is a term which becomes small so that a vector sampled from a prior distribution can be identified as the vector. The first identifier 14 adjusts parameters to minimize the learning loss $\text{loss}_{smalldis}$. $y_s[0]$ and $y'_s[1]$ are indexes of vectors handled by a program, and correspond to a first dimension and a second dimension of a two-dimensional vector ys output by the first identifier 14.

$$\text{loss}_{dis} \rightarrow -\log y[0] - \log y'[1] \quad (10)$$

In the above equation (10), $-\log y[0]$ is a term which becomes small so that the second identifier 16 can identify input learning data D1 as learning data D1, and $-\log y'[1]$ is a term which becomes small so that reconstruction data can be identified as reconstruction data. The second identifier 16 adjusts parameters to minimize the learning loss $\text{loss}_{dis}$. $y[0]$ and $y'[1]$ are indexes of vectors handled by a program, and correspond to a first dimension and a second dimension of a two-dimensional vector y output by the second identifier 16.

In the adjustment processing in the first identifier 14 and the second identifier 16, parameters are adjusted using, for example, the following equations (11) to (14) to reduce the learning loss $loss_{smalldis}$ and the learning loss $loss_{dis}$.

$$W_{smalldis} \leftarrow W_{smalldis} - \alpha \frac{\partial loss_{smalldis}}{\partial W_{smalldis}} \quad (11)$$

In the above equation (11), $W_{smalldis}$ is a weight parameter (strength of connection) held by the neural net of the first identifier 14, and α is a coefficient (for example, a coefficient from 0 to 1). A differential calculation on the right side determines a gradient of $W_{smalldis}$ which reduces the learning loss $loss_{smalldis}$. $W_{smalldis}$ is updated by multiplying the gradient direction by a value of α.

$$W_{dis} \leftarrow W_{dis} - \alpha \frac{\partial loss_{dis}}{\partial W_{dis}} \quad (12)$$

In the above equation (12), $W_{dis}$ is a weight parameter (strength of connection) held by the neural net of the second identifier 16, and α is a coefficient (for example, a coefficient from 0 to 1). A differential calculation on the right side determines a gradient of $W_{dis}$ which reduces the learning loss $loss_{dis}$. $W_{dis}$ is updated by multiplying the gradient direction by a value of α.

$$b_{smalldis} \leftarrow b_{smalldis} - \alpha \frac{\partial loss_{smalldis}}{\partial b_{smalldis}} \quad (13)$$

In the above equation (13), $b_{smalldis}$ is a bias, and α is a coefficient (for example, a coefficient from 0 to 1). A differential calculation on the right side determines a gradient of $b_{smalldis}$ which reduces the learning loss $loss_{smalldis}$. $b_{smalldis}$ is updated by multiplying the gradient direction by a value of α.

$$b_{dis} \leftarrow b_{dis} - \alpha \frac{\partial loss_{dis}}{\partial b_{dis}} \quad (14)$$

In the above equation (14), $b_{dis}$ is a bias, and α is a coefficient (for example, a coefficient from 0 to 1). A differential calculation on the right side determines a gradient of $b_{dis}$ which reduces the learning loss $loss_{dis}$. $b_{dis}$ is updated by multiplying the gradient direction by a value of α.

Next, the encoder 10 determines whether sampling of the learning data D1 stored in the learning database is completed (step S111). When it is determined that the sampling of the learning data D1 is not completed, the encoder 10 samples at least one piece of the remaining learning data D1 and performs the compression and decoding processing, and parameter adjustment processing thereon. On the other hand, when it is determined that the sampling of the learning data D1 is completed, the encoder 10 determines that one learning processing cycle for the above learning data group is completed, and counts the number of times learning processing has been performed. For example, the encoder 10 counts the number of times learning processing has been performed by incrementing parameters for measuring the number of times processing has been performed set on a memory (not shown) provided therein.

Next, the encoder 10 determines whether the number of times learning processing has been performed has reached a predetermined number of times (step S113). The encoder 10 performs learning processing on the learning data group again when it is determined that the number of times learning processing has been performed is less than the predetermined number of times. In this manner, it is possible to improve accuracy in parameter adjustment by repeatedly performing the learning processing on the same learning data group. On the other hand, the encoder 10 ends processing of the present flowchart when it is determined that the number of times learning processing has been performed is equal to or greater than the predetermined number of times.

In the learning processing by the learning device 1, a multilayered neural network (Deep Neural Network: DNN), a convolutional neural network (CNN), or a recurrent neural network (RNN) may also be adopted.

Figure 5:
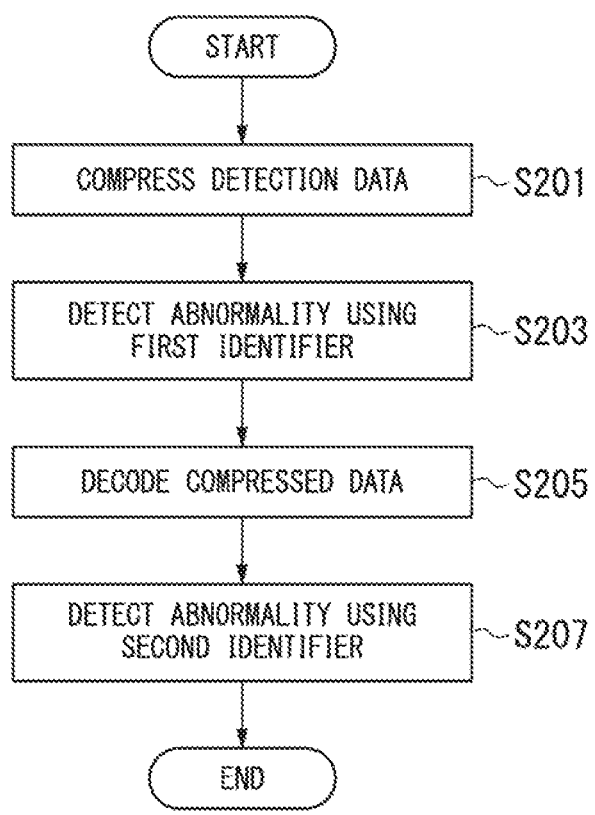
FIG. 5 is a flowchart which shows an example of a flow of processing by the abnormality detection device according to the embodiment.
Figure 7:
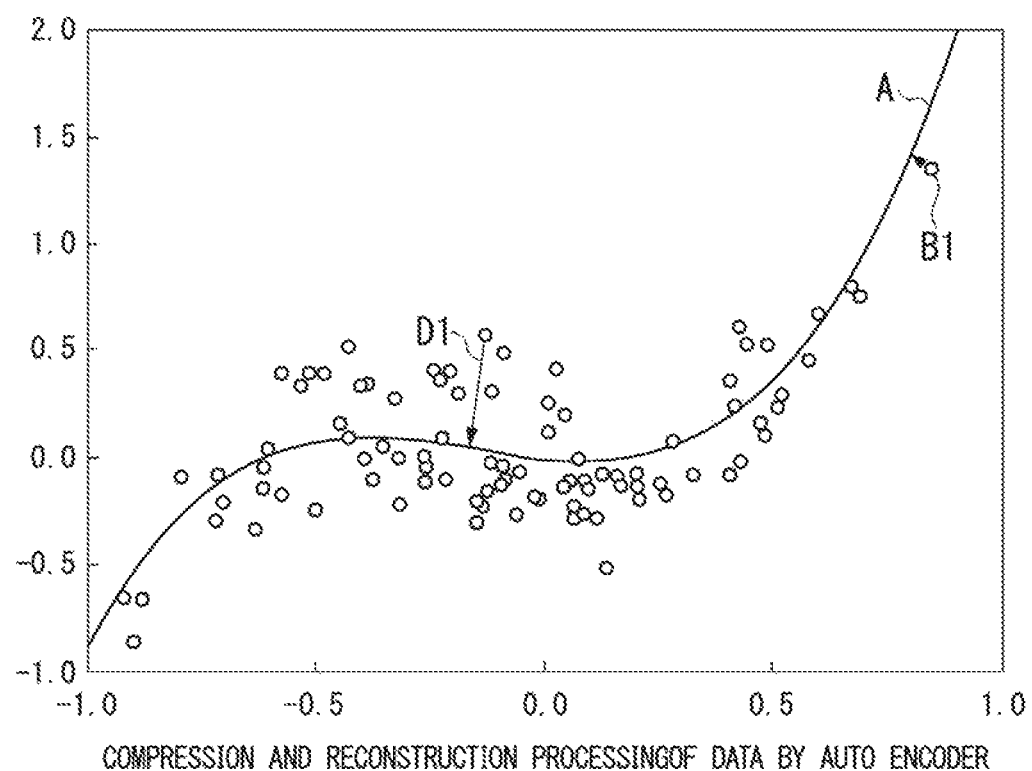
FIG. 7 is a view which describes compression and reconstruction processing of data by the auto encoder.

Next, an operation of the abnormality detection device 1A of the embodiment will be described. FIG. 5 is a flowchart which shows an example of a flow of processing by the abnormality detection device 1A according to the embodiment. FIG. 6 is a view which shows an example of a detection result by the abnormality detection device 1A according to the embodiment.

First, the encoder 10 compresses the detection data D2 and outputs the compressed data to the first identifier 14 and the decoder 12 (step S201).

Next, the first identifier 14 performs abnormality detection on the compressed data input from the encoder 10 (step S203). For example, the first identifier 14 determines that the compressed data is abnormal (a first abnormality) when a sum of a logarithm probability density on the prior distribution of the compressed data input from the encoder 10 and a logarithm density ratio of the compressed data distribution to the prior distribution is equal to or less than a predetermined threshold value (a first threshold value), and determines that the compressed data is normal when it is greater than the first threshold value. The logarithm density ratio of the compressed data distribution to the prior distribution is obtained as a logarithm of the quotient of a prior distribution probability with respect to a compressed data probability output as a final layer of the first identifier 14.

In the abnormality detection processing by the first identifier 14, in consideration of density on a manifold, data positioned in a range with a low density on a manifold is determined to be abnormal and data positioned in a range with a high density on a manifold is determined to be normal. For example, when the encoder 10 outputs compressed data of data (normal data) indicating an image of a vehicle of a data number 1 shown in FIG. 6 to the first identifier 14, the compressed data is data positioned in the range with a high density on a manifold, and thus the first identifier 14 determines that the compressed data is normal. On the other hand, data (abnormal data) indicating an image compressed in a height direction of a vehicle of a data number 3 shown in FIG. 6 is data positioned in the range with a low density on a manifold. When the encoder 10 outputs compressed data of the image data to the first identifier 14, the compressed data has a density on a manifold lower than the first threshold value, and thus the first identifier 14 determines that the compressed data is abnormal.

Next, the decoder 12 generates reconstruction data by decoding compression data input from the encoder 10, and outputs the reconstruction data to the second identifier 16 (step S205).

Next, the second identifier 16 calculates an abnormality degree indicating a degree of the difference between the reconstruction data input from the decoder 12 and the detection data D2, and performs abnormality detection of data on the basis of this abnormality degree (step S207). The second identifier 16 determines that data is abnormal (a second abnormality) when the abnormality degree is equal to or greater than a predetermined threshold value (a second threshold value), and determines that data is normal when the abnormality degree is less than the second threshold value.

For example, the encoder 10 compresses the data (normal data) indicating the image of the vehicle of the data number 1 shown in FIG. 6 as the detection data D2, and when the decoder 12 decodes the compressed data and outputs the data to the second identifier 16, the reconstruction data is the same data as the detection data D1, and thus the second identifier 16 determines that the detection data D2 is normal. On the other hand, the encoder 10 compresses data such as data (abnormal data) indicating an image in which part of a vehicle of a data number 2 shown in FIG. 6 is missing and data (abnormal data) indicating an image in which a doorknob of a vehicle of a data number 4 is missing as the detection data D2, and when the decoder 12 decodes the compressed data and outputs the data to the second identifier 16, the detection data D2 has a big difference between the reconstruction data and the detection data D1 (the abnormality degree is higher than the second threshold value), and thus the second identifier 16 determines that the detection data D2 is abnormal. Accordingly, the processing of the present flowchart ends.

According to at least one of the embodiments described above, the encoder is configured to compress input data using a compression parameter to generate compressed data. The first identifier is configured to determine whether a distribution of the compressed data input by the encoder is a distribution of the compressed data or a predetermined prior distribution, and inputs a first identification result to the encoder. The decoder is configured to decode the compressed data using a compressing parameter to generate reconstructed data. The second identifier is configured to determine whether the reconstructed data input by the decoder is the reconstruction data or the input data and outputs a second identification result to the encoder and the decoder.

In addition, some functions of the learning device 1 and the abnormality detection device 1A may be realized by a computer. In this case, a program for realizing the functions is recorded in a computer-readable information recording medium. Then, the program recorded in the information recording medium in which the program is recorded may also be realized by being read and executed by a computer system. The "computer system" herein includes an operating system and hardware such as a peripheral apparatus. Moreover, the "computer-readable information recording medium" refers to a portable medium, a storage device, or the like. The portable medium is a flexible disk, a magneto-optical disc, a ROM, a CD-ROM, or the like. Furthermore, the storage device is a hard disk embedded in the computer system, or the like.

Furthermore, the "computer-readable information recording medium" dynamically holds a program for a short period of time like a communication line when a program is transmitted via the communication line. The communication line is a network such as the Internet, a telephone line, or the like. In addition, the "computer-readable information recording medium" may be a volatile memory in the computer system serving as a server or a client. The volatile memory holds a program for a certain period of time. Moreover, the program may be a program for realizing some of the functions described above. Furthermore, the program may also be realized by combining the functions described above with a program which has been recorded in the computer system.

Further, the learning apparatus 1 and the abnormality detection apparatus 1A in the above-described embodiment may be integrated into an abnormality detection system described as follows. An abnormality detection system includes an encoder, a first identifier, a first identifier, a decoder and a second identifier. The encoder is configured to compress input data using a compression parameter to generate compressed data. The first identifier is configured to determine whether a distribution of the compressed data input by the encoder is a distribution of the compressed data or a predetermined prior distribution, and inputs a first identification result to the encoder. The decoder is configured to decode the compressed data using a compressing parameter to generate reconstructed data. The second identifier is configured to determine whether the reconstructed data input by the decoder is the reconstruction data or the input data and outputs a second identification result to the encoder and the decoder. The encoder adjusts the compressing parameter on the basis of the first identification result and the second identification result. The decoder adjusts the decoding parameter on the basis of the second identification result. The process of adjusting the compressing parameter and the process of adjusting the decoding parameter are repeated for a predetermined number of the input data. The encoder compresses a first input data using the adjusted compressing parameter and generates a first compressed data, after the process of adjusting the compressing parameter and the process of adjusting the decoding parameter are repeated for a predetermined number of the input data. The first identifier detects a first abnormality of the first input data on the basis of a logarithm probability density on a prior distribution of the compressed data and a logarithm density ratio of the first compressed data distribution to a prior distribution. The decoder decodes the first compressed data using the adjusted decoding parameter and generates a first reconstructed data, after the process of adjusting the compressing parameter and the process of adjusting the decoding parameter are repeated for a predetermined number of the input data. The second identifier calculates a difference between the first reconstruction data and the first input data, and detects a second abnormality of the first input data on the basis of the difference.

The system is implemented by the combination of the learning device and the abnormality detecting device. Whereas the configurations, the operations and functions would be anticipated by the descriptions in those for the learning device and the abnormality detecting device, the duplicate descriptions will be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An abnormality detection device comprising:
a computer configured to operate as:
an encoder configured to compress input data using a compressing parameter to generate compressed data;
a first identifier configured to detect a first abnormality of the input data on the basis of a logarithm probability density on a prior distribution of the compressed data and a logarithm density ratio of the compressed data distribution to the prior distribution;
a decoder configured to decode compressed data using a decoding parameter to generate reconstructed data; and
a second identifier configured to calculate a difference between the reconstruction data and the input data, and to detect a second abnormality of the input data on the basis of the difference,
wherein the first identifier compares intermediate layer data of compressed data compressed by the encoder with intermediate layer data of the prior distribution and detects the first abnormality, and
the second identifier compares intermediate layer data of reconstruction data decoded by the decoder with intermediate layer data of the input data and detects the second abnormality.

2. The abnormality detection device according to claim 1, wherein the first identifier detects that the input data is the first abnormality when a sum of a logarithm probability density on the prior distribution of compressed data compressed by the encoder and a logarithm density ratio of a compressed data distribution to a prior distribution is equal to or less than a first threshold value, and
the second identifier detects that the input data is the second abnormality when a difference between reconstruction data decoded by the decoder and the input data is equal to or greater than a second threshold value.

3. A learning device comprising:
a computer configured to operate as:
an encoder configured to compress input data using a compression parameter to generate a compressed data;
a first identifier configured to determine whether a distribution of the compressed data input by the encoder is a distribution of the compressed data or a prior distribution prepared in advance, and input a first identification result to the encoder;
a decoder configured to decode the compressed data using a compressing parameter to generate reconstructed data; and
a second identifier configured to determine whether the reconstructed data input by the decoder is the reconstruction data or the input data and output a second identification result to the encoder and the decoder,
wherein the encoder adjusts the compressing parameter on the basis of the first identification result and the second identification result, and
the decoder adjusts the decoding parameter on the basis of the second identification result,
wherein the encoder adjusts the compressing parameter to reduce a difference between the distribution of compressed data and the prior distribution, and
the decoder adjusts the decoding parameter to reduce a difference between the reconstruction data and learning data.

4. A learning device comprising:
a computer configured to operate as:
an encoder configured to compress input data using a compression parameter to generate a compressed data;
a first identifier configured to determine whether a distribution of the compressed data input by the encoder is a distribution of the compressed data or a prior distribution prepared in advance, and input a first identification result to the encoder;
a decoder configured to decode the compressed data using a compressing parameter to generate reconstructed data; and
a second identifier configured to determine whether the reconstructed data input by the decoder is the reconstruction data or the input data and output a second identification result to the encoder and the decoder,
wherein the encoder adjusts the compressing parameter on tale basis of the first identification result and the second identification result, and
the decoder adjusts the decoding parameter on the basis of the second identification result
wherein the first identifier compares intermediate layer data of compressed data compressed by the encoder with intermediate layer data of the prior distribution and performs the identification, and
the second identifier compares intermediate layer data of reconstruction data decoded by the decoder with intermediate layer data of learning data and performs the identification.

5. An abnormality detection method comprising:
compressing input data using a compressing parameter to generate a compressed data;
detecting a first abnormality of the input data on the basis of a logarithm probability density on a prior distribution of the compressed data and a logarithm density ratio of the compressed data distribution to the prior distribution;
decoding the compressed data using a decoding parameter to generate a reconstructed data; and
calculating a difference between the reconstruction data and the input data, and detecting a second abnormality of the input data on the basis of the difference,
wherein the detecting the first abnormality compares intermediate layer data of compressed data compressed by the compressing with intermediate layer data of the prior distribution and detects the first abnormality, and
the calculating the difference compares intermediate layer data of reconstruction data decoded by the decoding with intermediate layer data of the input data and detects the second abnormality.

6. A learning method comprising:
compressing input data using a compression parameter to generate compressed data;
identifying whether a distribution of the compressed data input by an encoder is a distribution of the compressed data or a prior distribution prepared in advance, and inputting a first identification result to the encoder;
decoding the compressed data using a compressing parameter to generate a reconstructed data;
identifying whether the reconstructed data input by a decoder is the reconstruction data or the input data and output a second identification result to the encoder and the decoder;
adjusting the compressing parameter on the basis of the first identification result and the second identification result; and
adjusting the decoding parameter on the basis of the second identification result,
wherein the compressing adjusts the compressing parameter to reduce a difference between the distribution of compressed data and the prior distribution, and the decoding adjusts the decoding parameter to reduce a difference between the reconstruction data and learning data.

7. A learning method comprising:

compressing input data using a compression parameter to generate compressed data;

first identifying whether a distribution of the compressed data input by an encoder is a distribution of the compressed data or a prior distribution prepared in advance, and inputting a first identification result to the encoder;

decoding the compressed data using a compressing parameter to generate a reconstructed data;

second identifying whether the reconstructed data input by a decoder is the reconstruction data or the input data and output a second identification result to the encoder and the decoder;

first adjusting the compressing parameter on the basis of the first identification result and the second identification result; and second adjusting the decoding parameter on the basis of the second identification result, wherein the first identifying compares intermediate layer data of compressed data compressed by the compressing with intermediate layer data of the prior distribution and performs the identification, and the second identifying compares intermediate layer data of reconstruction data decoded by the decoding with intermediate layer data of learning data and performs the identification.

* * * * *